(12) United States Patent
Thornewell et al.

(10) Patent No.: US 8,347,100 B1
(45) Date of Patent: Jan. 1, 2013

(54) METHODS FOR DNSSEC PROXYING AND DEPLOYMENT AMELIORATION AND SYSTEMS THEREOF

(75) Inventors: Peter M. Thornewell, Seattle, WA (US); Christopher R. Baker, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 351 days.

(21) Appl. No.: 12/836,053

(22) Filed: Jul. 14, 2010

(51) Int. Cl.
*H04L 9/32* (2006.01)
*G06F 7/04* (2006.01)

(52) U.S. Cl. .......................... 713/176; 726/5

(58) Field of Classification Search .................. 713/176; 726/5
See application file for complete search history.

(56) References Cited

U.S. PATENT DOCUMENTS

| | | | | |
|---|---|---|---|---|
| 7,620,733 | B1 * | 11/2009 | Tzakikario et al. | 709/245 |
| 2010/0077462 | A1 * | 3/2010 | Joffe et al. | 726/5 |
| 2010/0161774 | A1 * | 6/2010 | Huang et al. | 709/221 |

OTHER PUBLICATIONS

Arends et al., "Protocol Modifications for the DNS Security Extensions," Network Working Group, RFC 4035, Mar. 1, 2005, 54 pages, The Internet Society.
International Search Report and Written Opinion for PCT/US2011/054331, Mar. 13, 2012, 13 pages.
Meyer et al., "F5 and Infoblox DNS Integrated Architecture: Offering a Complete Scalable, Secure DNS Solution," F5 Technical Brief, Feb. 2, 2010, 18 pages, URL: http://web.archive.prg/web/20100326145019/http://www.f5.com/pdf/white-papers/infoblox-wp.pdf.
Weiler et al., "Minimally Covering NSEC Records and DNSSEC On-line Signing," Network Working Group, RFC 4470, Apr. 2006, 8 pages, The Internet Society.
Forrester Research, Inc., "DNSSEC Ready for Prime Time", Forrester Research, Inc. Cambridge, MA (Jul. 2010).
Bagnulo, et al., "DNS extensions for Network Address translation from IPv6 Clients to IPv4 Servers", IETF Trust (Jul. 2010).
Thomson, et al., "DNS Extensions to Support IP Version 6", The Internet Society (Oct. 2003).
Wikipedia, "List of DNS record types", retrieved from Internet URL: http://en.wikipedia.org/wiki/List_of_DNS_record_types (Jun. 2010).
Wikipedia, "IPv6", retrieved from Internet URL: http://en.wikipedia.org/wiki/IPv6 (Jun. 2010).
Wikipedia, "Domain Name System Security Extensions", retrieved from Internet URL: http://en.wikipedia.org/wiki/DNSSEC (Jun. 2010).
Dan Kaminsky, (slideshow presentation) "Black Ops of Fundamental Defense: Introducing the Domain Key Infrastructure", retrieved from Internet URL: http://www.slideshare.net/RecursionVentures/dki-2, (Aug. 2010).
Bau et al., "A Security Evaluation of DNSSEC with NSEC3," Mar. 2, 2010; updated version corrects and supersedes a paper in the NDSS' 10 proceedings, pp. 1-17.

(Continued)

*Primary Examiner* — Techane Gergiso
(74) *Attorney, Agent, or Firm* — LeClairRyan, a Professional Corporation

(57) ABSTRACT

A method, computer readable medium, and device for providing authenticated domain name service includes forwarding at a traffic management device a request for a domain name from a client device to one or more servers coupled to the traffic management device. The traffic management device receives a first response comprising at least a portion of the domain name from the one or more servers. The traffic management device attaches a first signature to the first response when the first response is determined by the traffic management device to be an unauthenticated response, and provides the first response with the first signature to the client device.

21 Claims, 3 Drawing Sheets

OTHER PUBLICATIONS

"Big-IP® Global Traffic Manager," <http://www.f5.com/products/big-ip/product-modules/global-traffic-manager.html>, last accessed Jul. 6, 2010, 2 pages.

"Big-IP® Global Traffic Manager™ and Big-IP Link Controller™: Implementations," Manual 0304-00, Dec. 3, 2009, pp. 1-161, version 10.1, F5 Networks, Inc.

"Big-IP® Systems: Getting Started Guide," Manual 0300-00, Feb. 4, 2010, pp. 1-102, version 10.1, F5 Networks, Inc.

"Detail Requirement Report: RQ-GTM-0000024," <http://fpweb/fptopic.asp?REQ=RQ-GTM-0000024>, F5 Networks, Inc., 1999, printed Mar. 31, 2010, 2 pages.

"Detail Requirement Report: RQ-GTM-0000028," <http://fpweb/fptopic.asp?REQ=RQ-GTM-0000028>, F5 Networks, Inc., 1999, printed Mar. 31, 2010, 2 pages.

"DNS DDOS Protection Functional Spec," BigipDNSDDOSProtectionFS<TMO<TWiki, last accessed Mar. 31, 2010, 2 pages.

"DNSSEC Functional Spec," TMOSDnsSECFS<TMOS<TWiki, last accessed on Mar. 31, 2010, pp. 1-10.

"DNS Security (DNSSEC) Solutions," <http://www.f5.com/solutions/security/dnssec>, F5 Networks, Inc., printed Aug. 23, 2010, pp. 1-4.

"DNSX; DNSX Secure Signer; DNSSEC Management Solution," <http://www.xelerance.com/dnssec>.pp. 1-9, Aug. 2009.

"F5 and Infoblox Provide Customers with Complete DNS Security Solution," <http://www.f5.com/news-press-events/press/2010/20100301.html>, Mar. 1, 2010, 2 pages, F5 Networks, Inc., Seattle and Santa Clara, California.

"F5 Solutions Enable Government Organizations to Meet 2009 DNSSEC Compliance,". <http://www.f5.com/news-press-events/press/2009/20091207.html>, Dec. 7, 2009, 2 pages, F5 Networks, Inc., Seattle, California.

Higgins, Kelly Jackson, "Internet Infrastructure Reaches Long-Awaited Security Milestone," Tech Center: Security Services, <http//www.darkreading.com/securityservices/security/management/showArticle.jhtml?article>, Jul. 28, 2010. pp. 1-4.

Laurie et al., "DNS Security (DNSSEC) Hashed Authenticated Denial of Existence," Network Working Group, RFC 5155, Feb. 2008, pp. 1-51.

MacVittie, Lori, "It's DNSSEC Not DNSSUX," DevCentral>Weblogs, <http://devcentral.f5.com/weblogs/macvittie/archive/2009/11/18/itrsquos-dnssec-not-dnssux.aspx>, posted on Nov. 18, 2009, accessed on Jul. 6, 2010, pp. 3-7.

"PDR/CDR for RQ-GTM-0000028," BigipDNSDDOSProtectionPDR<TMOS<TWiki, last accessed on Mar. 31, 2010, pp. 1-14.

"Secure64 DNS Signer," <www.secure64.com>, 2 pages, Apr. 2010.

Silva, Peter, "DNSSEC: The Antidote to DNS Cache Poisoning and Other DNS Attacks," F5 Technical Brief, 2009, pp. 1-10.

"Who is Xelerance," <http://www.xelerance.com>, slides 1-6, Jul. 2007.

* cited by examiner

METHODS FOR DNSSEC PROXYING AND DEPLOYMENT AMELIORATION AND SYSTEMS THEREOF

TECHNOLOGICAL FIELD

This technology generally relates to securing network applications, and more particularly, to systems and methods for Domain Name System Security Extensions (DNSSEC) proxying and deployment amelioration.

BACKGROUND

Global Internet Domain Name System, also referred to as the Domain Name System (DNS), defines a tree of names starting with root, ".", immediately below which are top level domain names such as ".com" and ".us". Below top level domain names there are normally additional levels of names. Domain Name System (DNS) was invented as a technology for enabling humans to identify computers, services, and resources connected to a network (e.g., Internet) by corresponding names rather than network addresses (e.g., Internet Protocol (IP) addresses) in a number format. DNS translates human readable names into unique binary information of network devices to enable users to find the devices they need. Unfortunately, conventional DNS is not secure and is highly prone to malicious interception. The insecure nature of DNS has been known to cause substantial loss of privacy, data, and identity theft, among many other problems. For example, one of the ways in which DNS can be exploited is called DNS cache poisoning. When a client device inputs a Uniform Resource Locator (URL) into a client browser, a DNS resolver checks the Internet for the proper name/number translation and location. Typically, DNS will accept the first response or answer obtained without question and direct the client device to the site referred to in the response. The server receiving the DNS response will also cache that information for a period of time until it expires, so upon the next request for that name/number, the site is immediately delivered to the requesting client device. Since users at client devices assume they are getting the correct information, when a malicious system responds to the DNS query first with modified, false information, security of the client device is breached. Not only does that single computer get sent to the wrong place, but if the malicious server is answering for a service provider, then thousands of users can get sent to a rogue system. This misdirection of a URL request can last for hours to days, depending on how long the server stores the information, and all the other DNS servers that propagate the information can also be affected. The imminent dangers posed by a rogue site include delivering malware, committing fraud, and stealing personal or sensitive information.

To overcome some of the drawbacks of conventional DNS systems, Domain Name System Security Extensions (DNSSEC) were introduced as an attempt to add security to DNS while maintaining the backward compatibility needed to scale with the Internet as a whole. DNSSEC adds a digital signature to ensure the authenticity of certain types of DNS transactions and, therefore, the integrity of the information. DNSSEC is a series of DNS protocol extensions, described in Request for Comments (RFCs) 4033, 4034, and 4035, hereby incorporated by reference in their entireties, that ensures the integrity of data returned by domain name lookups by incorporating a chain of trust into the DNS hierarchy. The chain is built using public key infrastructure (PKI), with each link in the chain consisting of a public/private key pair. Deploying DNSSEC involves signing zones with public/private key encryption and returning DNS responses with signatures. A client's trust in the signatures is based on the chain of trust established across administrative boundaries, from parent to child zone, using a Domain Name System Key (DNSKEY) and delegation signer (DS) resource records, which were not defined in DNS specifications. In DNSSEC, since an unbroken chain of trust is established from the root at the top through the top-level domain (TLD) and down to individual registrants, the client device's answer always receives an authenticated response. All zones are authenticated by "signing," in that a publisher of a zone signs that zone prior to publication, and the parent of that zone publishes the keys of that zone. With millions of zones, it is likely that the keys expire before the DNS records are updated. As a result, zone operators require techniques to automatically allocate keys to DNS records before these keys expire. Unfortunately, conventional systems are unable to handle management of keys for DNSSEC. Further, conventional DNS systems are unable to translate non-DNSSEC responses to DNSSEC responses.

Furthermore, conventional network systems are unable to handle DNS SEC signatures when zone names are dynamically updated. For example, consider a zone name that was previously signed statically. Subsequently, when the zone name is updated or changed, the DNSSEC signature for the earlier version of the zone is rendered invalid, and since the new zone is unsigned, there is no method for conventional systems to automatically enable DNSSEC for the dynamic update to the zone in real time.

In another related scenario, for global server load balancing (GSLB)-type DNS responses in which the Internet Protocol (IP) answer in a response to a request from a client device can change depending on the requesting client device, conventional systems are unable to provide DNSSEC for such dynamically changing domain names while at the same time performing global load balancing. Since GSLB can provide different answers to different clients for the same domain name, GSLB and DNSSEC are fundamentally at odds in the original design specifications. DNSSEC, as originally conceived, was focused solely on traditional static DNS and never considered the requirements of GSLB, or intelligent DNS. Unfortunately it is difficult for conventional systems to provide DNSSEC for dynamic DNS, and to provide DNSSEC for GSLB-type DNS responses in a load balancing scenario where there might be two different answers for the same request and the GSLB has to forward a signed response to the client device.

SUMMARY

One example of the technology is a method for providing authenticated domain name service. The method includes forwarding at a traffic management device a request for a domain name from a client device to one or more servers coupled to the traffic management device. The traffic management device receives a first response comprising at least a portion of the domain name from the one or more servers. The traffic management device attaches a first signature to the first response when the first response is determined by the traffic management device to be an unauthenticated response, and provides the first response with the first signature to the client device.

Another example includes a computer readable medium having stored thereon instructions for providing authenticated domain name service, which when executed by at least one processor, causes the processor to perform a number of steps. The steps include forwarding at a traffic management device a request for a domain name from a client device to one or more servers coupled to the traffic management device. The traffic management device receives a first response comprising at least a portion of the domain name from the one or more servers. The traffic management device attaches a first signature to the first response when the first response is determined by the traffic management device to be an unauthenticated response, and provides the first response with the first signature to the client device.

Another example is that of a traffic management device, which includes one or more processors executing one or more traffic management applications, a memory coupled to the one or more processors by a bus, a network interface controller coupled to the one or more processors and the memory and configured to receive data packets from a network that relate to the executing traffic management applications, and provide authenticated domain name service. In this example, at least one of the one or more processors is configured to execute programmed instructions stored in the memory and the network interface controller including logic capable of being further configured to implement forwarding at a traffic management device a request for a domain name from a client device to one or more servers coupled to the traffic management device. The traffic management device receives a first response comprising at least a portion of the domain name from the one or more servers. The traffic management device attaches a first signature to the first response when the first response is determined by the traffic management device to be an unauthenticated response, and provides the first response with the first signature to the client device.

The examples offer numerous advantages. By way of example only, technology disclosed enables signing DNS responses in real time and deploying DNSSEC quickly and easily in an existing network environment, thereby ensuring that answers to domain name requests received by the client devices when asking for name resolution come from a trusted name server, and not a hacker. The examples support Federal Information Processing Standard (FIPS) storage of the private keys, and are able to securely synchronize the keys between multiple FIPS devices. Additionally, examples of the disclosed technology use a cryptographic module or storage chip on a motherboard of a traffic management device to secure a unique hardware key as part of the multi-layer encryption process. When a response from a non-DNSSEC server is returned, the response is signed in real time to ensure continuous signing. The potential attacker cannot forge the signed response without the corresponding private key.

Further, the examples enable compliance with federal DNSSEC mandates and help protect valuable domain names and web properties from rogue servers sending invalid responses. Furthermore, the examples of the technology enable global server load balancing (GSLB)-type DNSSEC responses in which the IP answer can change depending on the requesting client by signing answers at the time the traffic management device (with load balancing functionality) decides what the answer to a request should be. These and other advantages, aspects, and features will become more apparent from the following detailed description when viewed in conjunction with the accompanying drawings. Non-limiting and non-exhaustive examples are described with reference to the following drawings. Accordingly, the drawings and descriptions below are to be regarded as illustrative in nature, and not as restrictive or limiting.

DETAILED DESCRIPTION

Various examples of the technology disclosed enable a traffic management device 110 to handle mismatches between non-DNSSEC and DNSSEC environments. For example, client devices operating in a DNSSEC environment need to communicate with servers operating in a non-DNSSEC environment. Traffic management device 110 provides secure conversion from one environment to another and prevents malicious "man-in-the-middle" attacks.

Figure 1:
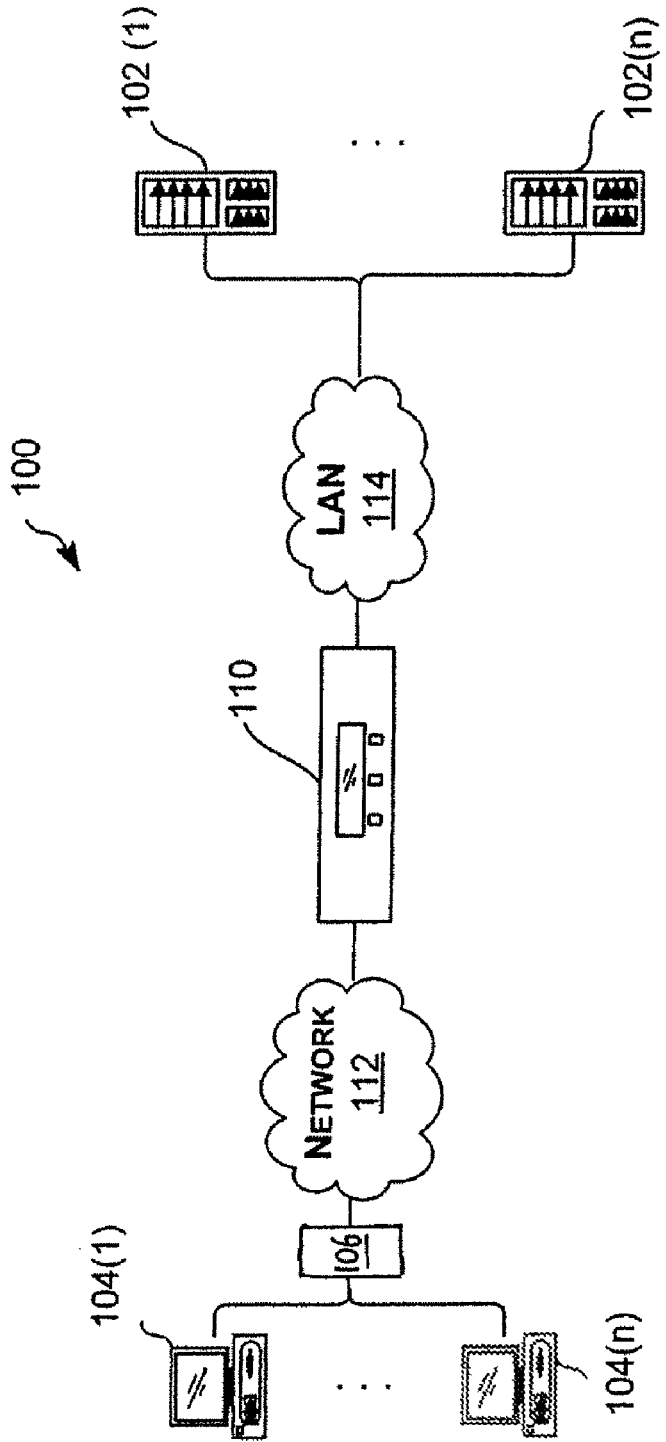
FIG. 1 illustrates an exemplary network system environment using traffic management device for DNSSEC proxying and deployment amelioration.

Referring to FIG. 1, an exemplary network system 100 including traffic management device 110 that is configured to provide authenticated domain name service, for example, to requesting client computers 104(1) to 104(n) is illustrated. By way of example only, a network 112 can provide responses and requests according to the Hyper-Text Transfer Protocol (HTTP) based application, request for comments (RFC) document guidelines or the Common Internet File System (CIFS) or network file system (NFS) protocol in this example, although the principles discussed herein are not limited to these examples and can include other application protocols and other types of requests (e.g., File Transfer Protocol (FTP) based requests). The exemplary network system 100 can include a series of one or more client devices such as client computers 104(1) to 104(n). Client computers 104(1)-104(n) are coupled to traffic management device 110 via a local domain name server (LDNS) 106. In some examples, LDNS 106 is optional and client computers 104(1)-104(n) are coupled to traffic management device 110 directly or via a network 112. Traffic management device 110 is interposed in between servers 102(1) to 102(n) and the client devices 104 (1) to 104(n) for providing one or more communication channels through network 112 and a Local Area Network (LAN) 114, although other communication channels may be directly established between various devices in network system 100 without network 112 and/or LAN 114. For clarity and brevity, in FIG. 1 two server devices 102(1) and 102(n) are shown, but it should be understood that any number of server devices can use the exemplary network system 100. Likewise, two client devices 104(1)-104(n), one LDNS 106, and one traffic management device 110 are shown in FIG. 1, but any number of client devices, LDNSs, and traffic management devices can also use the exemplary network system 100 as well. Although network 112 and LAN 114 are shown, other numbers and types of networks could be used. The ellipses and the designation "n" denote an unlimited number of server devices and client devices, respectively.

Servers 102(1)-102(n) comprise one or more server computing machines or devices capable of operating one or more Web-based applications that may be accessed by network devices in the network 112, such as client computers 104(1)-104(n) (also referred to as client devices 104(1)-104(n)), via traffic management device 110, and may provide other data representing requested resources, such as domain name services and zones, particular Web page(s) corresponding to URL request(s), image(s) of physical objects, and any other objects, responsive to the requests, although the servers 102 (1)-102(n) may perform other tasks and provide other types of resources. It should be noted that while only two servers 102(1) and 102(n) are shown in the network system 100 depicted in FIG. 1, other numbers and types of servers may be coupled to the traffic management device 110. It is also contemplated that one or more of the servers 102(1)-102(n) may be a cluster of servers managed by a network traffic management device such as traffic management device 110. In one example, servers 102(1)-102(n) are DNS servers in a DNS environment. In another example, servers 102(1)-102(n) are DNSSEC servers in a DNSSEC environment. In yet another example, servers 102(1)-102(n) are a mix of DNS and DNSSEC servers, as can be understood by those of ordinary skill in the art upon reading this disclosure. In some examples, servers 102(1)-102(n) are Berkeley Internet Name Domain (BIND) servers.

The client computers 104(1)-104(n) in this example (also interchangeably referred to as client devices 104(1)-104(n), client computing devices 104(1)-104(n), clients 104(1)-104(n), and client computing systems 104(1)-104(n)) can run interface applications such as Web browsers that can provide an interface to make requests for and send data, including DNS and DNSSEC requests, to different Web server-based applications via LDNS 106 connected to the network 112 and/or via traffic management device 110. A series of network applications can run on the servers 102(1)-102(n) that allow the transmission of data that is requested by the client computers 104(1)-104(n). Servers 102(1)-102(n) can provide data or receive data in response to requests directed toward the respective applications on the servers 102(1)-102(n) from the client computers 104(1)-104(n). For example, as per the Transmission Control Protocol (TCP), packets can be sent to the servers 102(1)-102(n) from the requesting client computers 104(1)-104(n) to send data, although other protocols (e.g., FTP) may be used. It is to be understood that the servers 102(1)-102(n) can be hardware or software executing on and supported by hardware, or can represent a system with multiple servers, which can include internal or external networks. Servers 102(1)-102(n) can be domain name servers with DNS capabilities hosting one or more website zones. Alternatively, servers 102(1)-102(n) can be DNSSEC servers in a DNSSEC environment hosting one or more website zones. For example, the servers 102(1)-102(n) can be any BIND version of Microsoft Domain Controllers provided by Microsoft Corporation of Redmond, Wash., although other types of servers can be used. Further, additional servers can be coupled to the network 112 and/or LAN 114 and many different types of applications can be available on servers coupled to the network 112 and/or LAN 114.

Generally, the client devices such as the client computers 104(1)-104(n) can include virtually any computing device capable of connecting to another computing device to send and receive information, including Web-based information. The set of such devices can include devices that typically connect using a wired (and/or wireless) communications medium, such as personal computers (e.g., desktops, laptops), mobile and/or smart phones and the like. In this example, the client devices can run browsers and other types of applications (e.g., web-based applications) that can provide an interface to make one or more requests to different server-based applications via network 112, although requests for other types of network applications and resources, for example URLs, may be made by client computers 104(1)-104(n). Client computers 104(1)-104(n) can be configured to make DNSSEC and non-DNSSEC requests to servers 102(1)-102(n), or other types of traffic management devices (e.g., routers, load balancers, application delivery controllers, and the like).

Client computers 104(1)-104(n) can submit requests to LDNS 106. LDNS 106 can respond to the requests when resources are locally stored on LDNS 106, for example, in a local cache memory. For example, a client computer may request for a URL www.example.com. If LDNS 106 has a valid copy of www.example.com, it can directly provide this URL to the requesting client computer. In other scenarios, LDNS 106 forwards the requests to traffic management device 110 via network 112. LDNS 106 can be configured to expedite requests for network resources (e.g., URLs) based upon a history of requests from one or more client computers 104(1)-104(n). In one example, LDNS 106 can provide an initial response to a requesting one of client computers 104(1)-104(n) while additional resources are being fetched from severs 102(1)-102(n) resulting in a faster initial response for a request from client computers 104(1)-104(n). By way of example only, LDNS 106 can be a proxy server, or a server similar to servers 102(1)-102(n) but located between client computers 104(1)-104(n) and traffic management device 110.

A series of Web-based and/or other types of protected and unprotected network applications can run on servers 102(1)-102(n) that allow the transmission of data that is requested by the client computers 104(1)-104(n). The client computers 104(1)-104(n) can be further configured to engage in a secure communication directly with the traffic management device 110 and/or the servers 102(1)-102(n), via LDNS 106, or otherwise, using mechanisms such as Secure Sockets Layer (SSL), Internet Protocol Security (IPSec), Transport Layer Security (TLS), and the like.

In this example, network 112 comprises a publicly accessible network, such as the Internet, which includes client computers 104(1)-104(n), although network 112 may comprise other types of private and public networks that include other devices. Communications, such as requests from client computers 104(1)-104(n) and responses from servers 102(1)-102(n), take place over network 112 according to standard network protocols, such as the HTTP and TCP/IP protocols in this example, but the principles discussed herein are not limited to this example and can include other protocols (e.g., FTP). Further, network 112 can include local area networks (LANs), wide area networks (WANs), direct connections, other types and numbers of network types, and any combination thereof. On an interconnected set of LANs or other networks, including those based on different architectures and protocols, routers, switches, hubs, gateways, bridges, crossbars, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links, optical fibers, and other communications links known to those of ordinary skill in the relevant arts. Generally, network 112 includes any communication medium and method by which data may travel between client devices 104(1)-104(n), servers 102(1)-102(n), and traffic management device 110, and these devices are provided by way of example only.

In this example, each of the servers 102(1)-102(n), traffic management device 110, LDNS 106, and client computers 104(1)-104(n) can include a central processing unit (CPU), controller or processor, a memory, and an interface system which are coupled together by a bus or other link, although other numbers and types of each of the components and other configurations and locations for the components can be used.

Since these devices are well known to those of ordinary skill in the relevant art(s), they will not be described in further detail herein.

In addition, two or more computing systems or devices can be substituted for any one of the systems in the network system 100. Accordingly, principles and advantages of cloud computing and/or distributed processing, such as redundancy, replication, virtualization, and the like, can also be implemented, as appropriate, to increase the robustness and performance of the devices and systems of the network system 100. The network system 100 can also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, combination(s) thereof, and the like.

By way of example only and not by way of limitation, LAN 114 comprises a private local area network that includes the traffic management device 110 coupled to the one or more servers 102(1)-102(n), although the LAN 114 may comprise other types of private and public networks with other devices. Networks, including local area networks, besides being understood by those of ordinary skill in the relevant art(s), have already been described above in connection with network 112, and thus will not be described further here.

As shown in the example environment of network system 100 depicted in FIG. 1, the traffic management device 110 can be interposed between the network 112 and the servers 102(1)-102(n) coupled via LAN 114 as shown in FIG. 1. Again, the network system 100 could be arranged in other manners with other numbers and types of devices. Also, the traffic management device 110 is coupled to network 112 by one or more network communication links, and intermediate network devices, such as routers, switches, gateways, hubs, crossbars, and other devices. It should be understood that the devices and the particular configuration shown in FIG. 1 are provided for exemplary purposes only and thus are not limiting. Although a single traffic management device 110, additional traffic management devices may be coupled in series and/or parallel to the traffic management device 110, thereby forming a cluster, depending upon specific applications, and the single traffic management device 110 shown in FIG. 1 is by way of example only, and not by way of limitation.

Generally, the traffic management device 110 manages network communications, which may include one or more client requests and server responses, to/from the network 112 between the client computers 104(1)-104(n) and one or more of the servers 102(1)-102(n) in LAN 114 in these examples. These requests may be destined for one or more servers 102(1)-102(n), and, as alluded to earlier, may take the form of one or more TCP/IP data packets originating from the network 112, passing through one or more intermediate network devices and/or intermediate networks, until ultimately reaching the traffic management device 110, for example.

In one example, traffic management device 110 is configured as a global server load balancing device that distributes end-user application requests based on business policies, data center conditions, network conditions, user location, and application performance, such that each request from client computers 104(1)-104(n) is automatically directed to the closest or best-performing data center hosting one or more servers 102(1)-102(n). In this example, traffic management device 110 provides DNSSEC signed responses even when zone names have been dynamically updated. Although in this example, traffic management device 110 has global server load balancing capabilities, in alternative examples traffic management device 110 may receive responses from a global server load balancing (GSLB) device coupled to LAN 114. By way of example only, such a global load balancing device can be a BIG-IP® Global Traffic Manager™ provided by F5 Networks, Inc., of Seattle, Wash.

In addition, as discussed in more detail with reference to FIGS. 2-3, traffic management device 110 is configured to provide authenticated domain name service. In any case, the traffic management device 110 may manage the network communications by performing several network traffic management related functions involving network communications, secured or unsecured, such as load balancing, access control, VPN hosting, network traffic acceleration, encryption, decryption, cookie, and key management and providing authenticated domain name service in accordance with the systems and processes described further below in connection with FIGS. 2-3, for example.

Figure 2:
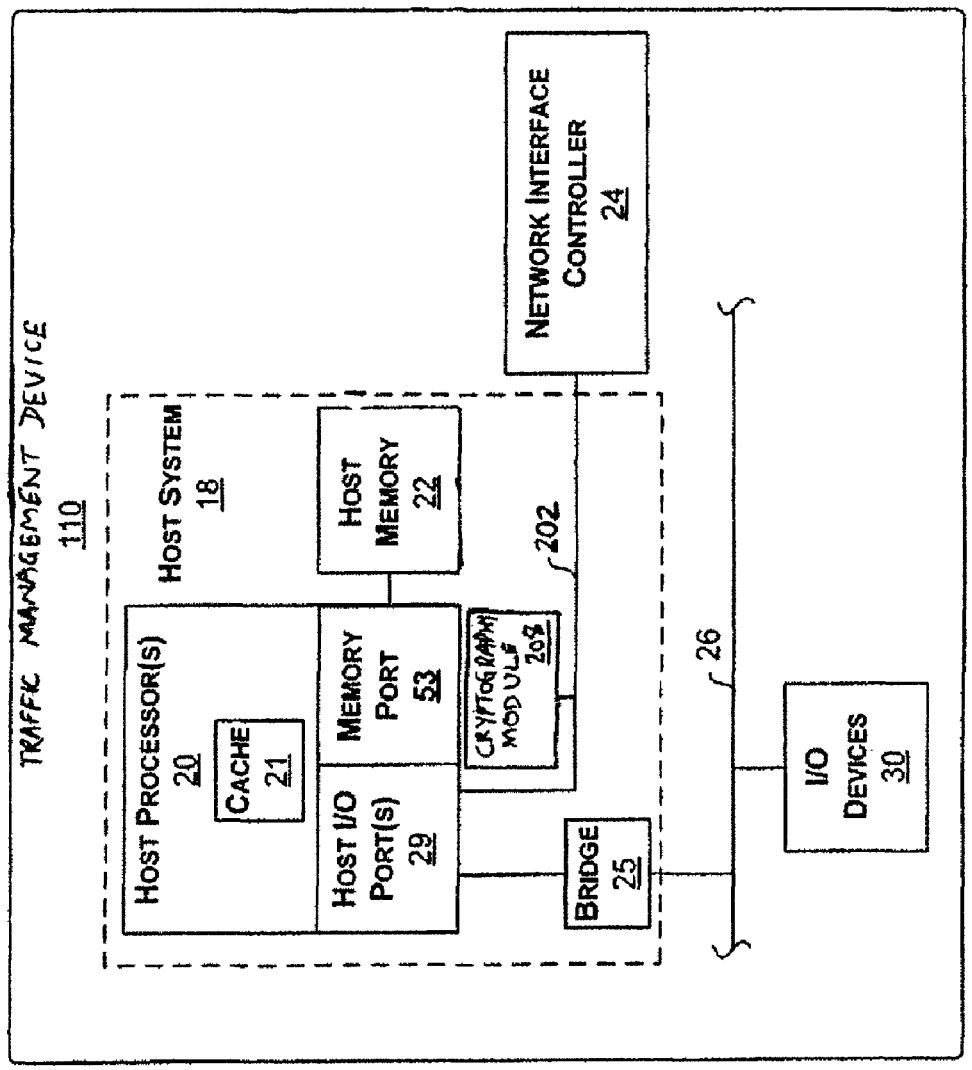
FIG. 2 is a partly schematic and partly functional block diagram of traffic management device in the exemplary network environment of FIG. 1.

Referring to FIG. 2, an exemplary traffic management device 110 is illustrated. Included within the traffic management device 110 is a system bus 26 (also referred to as bus 26) that communicates with a host system 18 via a bridge 25 and with an input-output (I/O) device 30. In this example, a single I/O device 30 is shown to represent any number of I/O devices connected to bus 26. In one example, bridge 25 is in further communication with a host processor 20 via host input output (I/O) ports 29. Host processor 20 can further communicate with a network interface controller 24 via a CPU bus 202, a host memory 22 (via a memory port 53), and a cache memory 21. As outlined above, included within the host processor 20 are host I/O ports 29, memory port 53, and a main processor (not shown separately). In this example, host system 18 includes a cryptography module 208.

In one example, traffic management device 110 can include the host processor 20 characterized by anyone of the following component configurations: computer readable medium and logic circuits that respond to and process instructions fetched from the host memory 22; a microprocessor unit, such as: those manufactured by Intel Corporation of Santa Clara, Calif.; those manufactured by Motorola Corporation of Schaumburg, Ill.; those manufactured by Transmeta Corporation of Santa Clara, Calif.; the RS/6000 processor such as those manufactured by International Business Machines of Armonk, N.Y.; a processor such as those manufactured by Advanced Micro Devices of Sunnyvale, Calif.; or any other combination of logic circuits capable of executing the systems and methods described herein. Still other examples of the host processor 20 can include any combination of the following: a microprocessor, a microcontroller, a central processing unit with a single processing core, a central processing unit with two processing cores, or a central processing unit with more than one processing core.

Examples of the traffic management device 110 include one or more application delivery controller devices of the BIG-IP® product family provided by F5 Networks, Inc. of Seattle, Wash., although other types of traffic management devices may be used. In an exemplary structure and/or arrangement, traffic management device 110 can include the host processor 20 that communicates with cache memory 21 via a secondary bus also known as a backside bus, while another example of the traffic management device 110 includes the host processor 20 that communicates with cache memory 21 via the system bus 26. The local system bus 26 can, in some examples, also be used by the host processor 20 to communicate with more than one type of I/O devices 30. In some examples, the local system bus 26 can be anyone of the following types of buses: a VESA VL bus; an ISA bus; an EISA bus; a Micro Channel Architecture (MCA) bus; a PCI bus; a PCI-X bus; a PCI-Express bus; or a NuBus. Other example configurations of the traffic management device 110 include I/O device 30 that is a video display (not shown separately) that communicates with the host processor 20 via an Advanced Graphics Port (AGP). Still other versions of the traffic management device 110 include host processor 20 connected to I/O device 30 via any one or more of the following connections: HyperTransport, Rapid I/O, or InfiniBand. Further examples of the traffic management device 110 include a communication connection where the host processor 20 communicates with one I/O device 30 using a local interconnect bus and with a second I/O device (not shown separately) using a direct connection. As described above, included within some examples of the traffic management device 110 is each of host memory 22 and cache memory 21. The cache memory 21, will, in some examples, be any one of the following types of memory: SRAM; BSRAM; or EDRAM. Other examples include cache memory 21 and host memory 22 that can be anyone of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device capable of executing the systems and methods described herein.

The host memory 22 and/or the cache memory 21 can, in some examples, include one or more memory devices capable of storing data and allowing any storage location to be directly accessed by the host processor 20. Such storage of data can be in a local database internal to traffic management device 110, or external to traffic management device 110 coupled via one or more input output ports of network interface controller 24. Further examples of traffic management device 110 include a host processor 20 that can access the host memory 22 via one of either: system bus 26; memory port 53; or any other connection, bus or port that allows the host processor 20 to access host memory 22.

One example of the traffic management device 110 provides support for anyone of the following installation devices: a floppy disk drive for receiving floppy disks such as 3.5-inch, 5.25-inch disks or ZIP disks, a CD-ROM drive, a CD-R/RW drive, a DVD-ROM drive, tape drives of various formats, USB device, a bootable medium, a bootable CD, a bootable compact disk (CD) for GNU/Linux distribution such as KNOPPIX®, a hard-drive or any other device suitable for installing applications or software. Applications can, in some examples, include a client agent, or any portion of a client agent. The traffic management device 110 may further include a storage device (not shown separately) that can be either one or more hard disk drives, or one or more redundant arrays of independent disks; where the storage device is configured to store an operating system, software, programs applications, or at least a portion of the client agent. A further example of the traffic management device 110 includes an installation device that is used as the storage device.

Furthermore, the traffic management device 110 can include network interface controller 24 to communicate, via an input-output port inside network interface controller 24, with a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, optical connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the traffic management device 110 includes network interface controller 24 configured to communicate with additional computing devices via any type and/or form of gateway or tunneling protocol such as Secure Socket Layer (SSL) or Transport Layer Security (TLS), or the Citrix Gateway Protocol manufactured by Citrix Systems, Inc. of Fort Lauderdale, Fla. Versions of the network interface controller 24 can comprise anyone of: a built-in network adapter; a network interface card; a PCMCIA network card; a card bus network adapter; a wireless network adapter; a USB network adapter; a modem; or any other device suitable for interfacing the traffic management device 110 to a network capable of communicating and performing the methods and systems described herein.

In various examples, the traffic management device 110 can include any one of the following I/O devices 30: a keyboard; a pointing device; a mouse; a gesture based remote control device; a biometric device; an audio device; track pads; an optical pen; trackballs; microphones; drawing tablets; video displays; speakers; inkjet printers; laser printers; and dye sublimation printers; or any other input/output device able to perform the methods and systems described herein. Host I/O ports 29 may in some examples connect to multiple I/O devices 30 to control the one or more I/O devices 30. Some examples of the I/O devices 30 may be configured to provide storage or an installation medium, while others may provide a universal serial bus (USB) interface for receiving USB storage devices such as the USB Flash Drive line of devices manufactured by Twintech Industry, Inc. Still other examples of an I/O device 30 may be bridge 25 between the system bus 26 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

According to some examples, traffic management device 110 includes cryptography module 208 integrated as part of host system 18 for carrying out various exemplary functions of storing private and public keys. Alternatively, cryptography module 208 may be a part of an autonomous application security manager module integrated with or communicating independently with the traffic management device 110. An exemplary application security manager is the BIG-IP® Application Security Manager™ provided by F5 Networks, Inc. of Seattle, Wash. In one example, cryptography module 208 includes a crypto-storage chip on the motherboard to secure one or more unique hardware keys as part of the multi-layer encryption process employed by traffic management device 110 to secure keys.

Accordingly, components of traffic management device 110 include one or more processors (e.g., host processor 20) executing one or more traffic management applications, memory (e.g., cache memory 21, and/or host memory 22) coupled to the one or more processors by a bus, network interface controller 24 coupled to the one or more processors and the host memory 22 and configured to receive data packets from a network that relate to the executing traffic management applications, and provide authenticated domain name service. In this example, at least one of the one or more processors is configured to execute programmed instructions stored in the memory (e.g., cache memory 21, and/or host memory 22) and the network interface controller 24 including logic capable of being further configured to implement forwarding at traffic management device 110 a request for a domain name from a client device (e.g., one or more of client computers 104(1)-104(n)) to one or more servers (e.g., servers 102(1)-102(n)) coupled to traffic management device 110. The traffic management device 110 receives a first response comprising at least a portion of the domain name from the one or more servers 102(1)-102(n). The traffic management device 110 attaches a first signature to the first response when the first response is determined by the traffic management device 110 to be an unauthenticated response, and provides the first response with the first signature to the client device (e.g., one or more of client computers 104(1)-104(n)).

The operation of example processes for providing authenticated domain name service using traffic management device 110 shown in FIGS. 1-2, will now be described with reference back to FIGS. 1-2 in conjunction with flow diagram or flowchart 300 shown in FIG. 3, respectively. The flowchart 300 is representative of example machine readable instructions for implementing in dynamic real-time authenticated domain name service, for example, at the traffic management device 110. In this example, the machine readable instructions comprise an algorithm for execution by: (a) a processor (e.g., host processor 20), (b) a controller, and/or (c) one or more other suitable processing device(s) within host system 18, for example. The algorithm may be implemented in software stored on tangible computer readable media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or implemented in firmware or dedicated hardware in a well known manner (e.g., it may be implemented by an application specific integrated circuit (ASIC), a programmable logic device (PLD), a field programmable logic device (FPLD), a field programmable gate array (FPGA), discrete logic, or the like). For example, at least some of the components of the traffic management device 110 could be implemented by software, hardware, and/or firmware. Also, some or all of the machine readable instructions represented by the process of flowchart 300 of FIG. 3 may be implemented manually at the traffic management device 110, for example, using a command line interface (CLI) prompt window operated by a system administrator. Further, although the example algorithm is described with reference to flowchart 300, persons of ordinary skill in the art will readily appreciate that many other methods of implementing the example machine readable instructions may alternatively be used. For example, the order of execution of the blocks in flowchart 300 may be changed, and/or some of the blocks described may be changed, eliminated, or combined.

Figure 3:
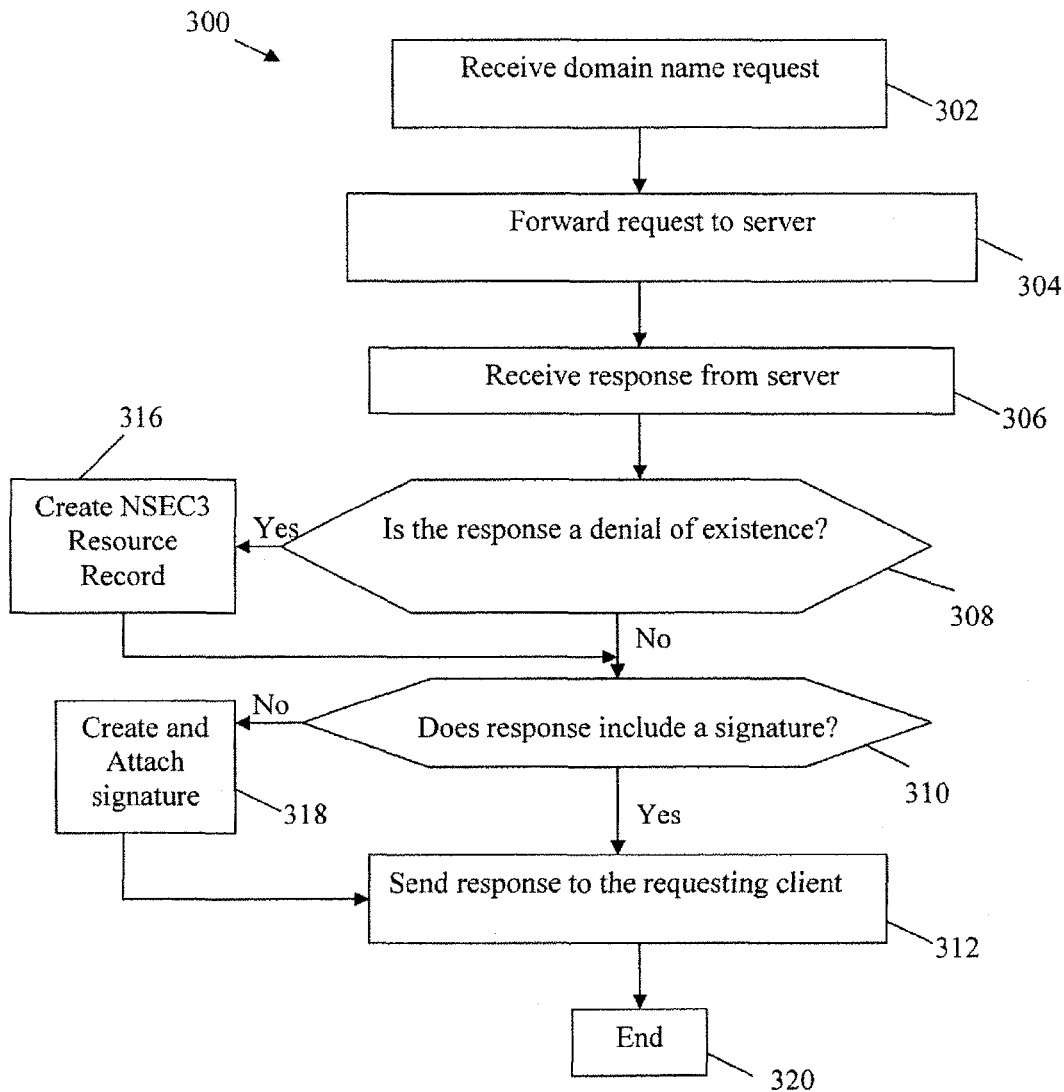
FIG. 3 is a flow chart of an exemplary process and method for DNSSEC proxying and deployment amelioration when a DNSSEC request is to be serviced using non-DNSSEC server devices.

Referring now to FIG. 3, flowchart 300 discusses a scenario where responses received from servers 102(1)-102(n) are not signed. It is to be noted servers 102(1)-102(n) may be able to sign some responses but are unable to sign some other responses, depending upon the request from client computers 104(1)-104(n).

In step 302 of the flowchart 300, traffic management device 110 receives a request from one of client computers 104(1)-104(n). In this example, the request from the client computers 104(1)-104(n) can be a DNSSEC request for an address record (also referred to as an 'A' record) that requires a signed response, or an authenticated response from one or more servers 102(1)-102(n). In this example, servers 102(1)-102(n) may not be able to provide an authenticated response to the request since the servers 102(1)-102(n) are in a conventional DNS only environment. By way of example only, the request can include a URL for a website www.example.com, where "." is the root, ".com" is a top-level domain, and ".example" is a second level domain, and so on, as can be understood by those of ordinary skill in the art. Further by way of example only and not by way of limitation, other types of top-level domains such as ".gov," ".org," ".net," and/or country specific domains (e.g., ".us") may be a part of the request from client computers 104(1)-104(n). The request from one of the client computers 104(1)-104(n) can come via LDNS 106, which may or may not have a cached copy of the requested resource for providing an initial response to the request. It is to be noted that the requests can be originating from anywhere around the earth, and are not geographically or otherwise restricted in their origin.

In step 304, traffic management device 110 forwards the received request to one of the servers 102(1)-102(n) after removing bits and/or headers to convert the request into a regular DNS request that can be understood by servers 102(1)-102(n). Although in this example servers 102(1)-102(n) are not DNSSEC enabled, they are still on a trusted network (e.g., on LAN 114).

In step 306, traffic management device 110 receives a response from one of servers 102(1)-102(n). In one example, the response includes a resource record set (RRSET) including one or more address records. The RRSET includes all the records of a given type for a given domain included in the original request, as known to those of ordinary skill in the art. In this example, the response can be for the root ".". Alternatively, the response can be for the top level domain ".com" and/or second level domain ".example". The response can include a plurality of responses in succession starting from the root, which is the highest level, to the lowest level domain, and can therefore comprise building a chain of trust for signing response received from servers 102(1)-102(n). For example, each of the responses from servers 102(1)-102(n) for root, top level, and second level domains, can be respectively analyzed for a signature, determined by the traffic management device 110 (e.g., in step 310 below). In the example of FIG. 3, since servers 102(1)-102(n) are regular DNS servers that are authoritative for the requested zone but do not have the capability to sign, the responses for root, top level, and second level domains will not be signed responses. As a result, the response received from servers 102(1)-102(n) in this example will not be DNSSEC compliant. For example, in one scenario a requested domain name, e.g., www.example.com, will not have a signature attached to it when received by the traffic management device 110. In another scenario, there will be dynamic updates to www.example.com records. In this scenario, a previously authenticated response forwarded by the traffic management device 110 to the requesting one of client computers 104(1)-104(n) will no more have a valid signature, and will need to be signed again at the traffic management device 110, as discussed below for step 318.

In step 308, traffic management device 110 determines whether the received response from one of the servers 102(1)-102(n) is a denial of existence response for the requested resource. Denial of existence can occur, for example, when the original request from the client computers 104(1)-104(n) is for a non-existent domain name. Alternatively, a denial of existence response may be received when one or more data records within a zone does not exist. For example, the name www.example.com may exist but an address record (or, 'A' record) at www.example.com may not exist and result in a denial of existence response from servers 102(1)-102(n). Since A records are well known to those of ordinary skill in the art, they will not be described in detail here. If the received response from one of the servers 102(1)-102(n) is a denial of existence, the flow proceeds to step 316, and if not, the flow proceeds to step 310.

In step 316, when the traffic management device 110 determines the received response from one of the servers 102(1)-102(n) is a denial of existence response, traffic management device 110 creates one or more next secure (NSEC3) resource records belonging to a cryptographically hashed domain name. Since NSEC3 resource records are known to those of ordinary skill in the art, they will not be described in detail here. In one example, traffic management device 110 dynamically manufactures the NSEC3 resource record based upon the request from the client, with no knowledge of the actual content of the relevant zone on domain name servers 102(1)-102(n), such that the manufactured NSEC3 resource record can be used by the client to prove non-existence of the requested name. In another example, traffic management device 110 may dynamically manufacture the NSEC3 resource record based upon the request from the client with some knowledge of the actual content of the relevant zone on domain name servers 102(1)-102(n). In yet another example, traffic management device 110 may dynamically manufacture the NSEC3 resource record based upon the request from the client with complete knowledge of the actual content of the relevant zone on domain name servers 102(1)-102(n). By way of example only, creating the NSEC3 resource record includes utilizing one of Secure Hash Algorithms (SHAs), although other types of hashing algorithms may be used. In this example, resource records created by traffic management device 110 as a response to a denial of existence of original resource from servers 102(1)-102(n) are trusted by client computers 104(1)-104(n), since traffic management device 110 itself is a trusted device for client computers 104(1)-104(n). Signatures to the created zone are then attached by traffic management device 110 as described in step 318 below.

One example of how the NSEC3 resource record is created by traffic management device 110 is by taking the requested non-existent name, say www.example.com and performing hashing using one of the DNSSEC specified secure hashing algorithms (e.g., SHA1) prior to sending the response to the requesting one of the client computers 104(1)-104(n). Assuming, by way of example only and not by way of limitation, the resulting hash is equal to "12345". The requesting one of client computers 104(1)-104(n) may need a "spanning" NSEC3 record for its proof of non-existence (i.e., the closest enclose proof as disclosed in RFC 5155), or it may need a "matching" NSEC3 record (i.e., the exact enclose proof as also disclosed in RFC 5155). For a spanning record, this example would take the hashed name "12345" and perform, for example, a "+1" or "−1" on the number the hash represents. Accordingly, in this case two numbers "12344" and "12346" are generated. These new hash values would span the original hashed non-existent name and would be used to create a spanning NSEC3 record at traffic management device 110. Similarly, for a matching record, two hash values are required, however, only the "+1" is created and paired with the original name by traffic management device 110, resulting in an NSEC3 record containing "12345" and "12346". It is to be noted that although in the examples above "+/−1" values were used, any increment method, for example "+/−N" where N is an integer, may be used and the "+/−1" is only an illustrative example and is not limiting. Additionally, this example represents a method to manufacture an NSEC3 resource record at traffic management device 110 in substantially real-time upon receipt of the response in step 306 with no knowledge of the actual set of names in the zone. As discussed above, additional scenarios where traffic management device 110 may have some or complete knowledge of contents of the zone may use this example for generating NSEC3 records. Since spanning and matching records are known to those of ordinary skill in the art, and are disclosed in RFC 5155 hereby incorporated by reference in its entirety, the will not be described in detail herein.

In step 310, traffic management device 110 determines if the response received from one of the servers 102(1)-102(n) was a DNSSEC response that included signatures for a top level domain, a second level domain, a sub-level domain, and/or all levels of the domain name. This determination can be made by the traffic management device 110 by checking whether or not the received response from servers 102(1)-102(n) includes a resource record signature (RRSIG), although other methods of determining may be used. Since RRSIG records that were introduced as a part of DNSSEC are known to those of ordinary skill in the art, they will not be described in detail here. If the received response includes an RRSIG, the flow proceeds to step 314. If not, the traffic management device 110 determines the response is unauthenticated, and the flow proceeds to step 318.

In step 318, traffic management device 110 dynamically in real-time generates one or more cryptographic signatures (e.g., RRSIG records) and attaches the signatures to the response received from one or more servers 102(1)-102(n). Attaching the signature can be performed in one or more of the following exemplary ways, although other ways of attaching signatures "on the fly" may be contemplated by those of ordinary skill in the art after reading this disclosure. For attaching a signature, traffic management device 110 is configured to allocate zone signing keys (ZSKs) and Key Signing Keys (KSKs) for the received response from servers 102(1)-102(n). In this example, KSKs are used to sign other DNS-KEY records, while ZSKs are used to sign all resource record sets (RRSETs). By way of example only, both KSKs and ZSKs can be made stronger by using more bits in the key material, and for security reasons, can be rotated at different time intervals (e.g., KSK every 12 months and the ZSK every one to two months). The public key infrastructure enables client computers 104(1)-104(n) to validate the integrity of the response received from non-DNSSEC servers 102(1)-102(n) signed with the private key. Since the private key of the public/private key pair could be used to impersonate a valid signer, those keys are kept secure, by way of example only, by storing them as hardware keys in cryptography module 208. By way of example only, cryptography module 208 supports FIPS storage of the private keys. Additionally, traffic management device 110 is configured to securely synchronize the keys between multiple FIPS devices, e.g., multiple traffic management devices. In one example, cryptography module 208 includes a crypto-storage chip on the motherboard to secure a unique hardware key as part of the multi-layer encryption process employed by traffic management device 110 to secure KSKs and ZSKs. Alternatively, KSKs and ZSKs may be secured, by way of example only and not by way of limitation, using secure SSL-encrypted storage systems. Accordingly, traffic management device 110 encrypts the response using the one or more keys, as discussed above.

In step 312, traffic management device 110 forwards the response with the signature, along with a public key to the requesting one of the client computers 104(1)-104(n). Since traffic management device 110 signs the response from servers 102(1)-102(n) and client computers 104(1)-104(n) trust the traffic management device 110, client computers 104(1)-104(n) can use the DNSKEY to validate the RRSET using RRSIG included in the forwarded response from traffic management device 110. The flow ends in step 320.

Example Use Case

In one exemplary global server load balancing (GSLB)-type scenario, traffic management device 110 configured as a load balancing device can provide responses that can change depending on the requesting client out of client computers 104(1)-104(n). Alternatively, traffic management device 110 may receive responses routed from a global load balancer connected to LAN 114. For example, for a request www.example.com, traffic management device 110 may receive two different responses—one from a server 102(1) and another from a server 102(2). Out of the two responses, it is possible that the response from server 102(1) may be the only one that is signed and the response from server 102(2) may not be signed. However, the response from server 102(2) might be the most current updated response with updated resource records. In such a scenario, traffic management device 110 will sign the response from server 102(2) according to the steps of flowchart 300, and forward the signed response to the client computers 104(1)-104(n), instead of sending the older signed response from server 102(1)-102(n).

Servers 102(1)-102(n) have DNS entries that are statically signed. Each time a DNS entry is updated, signatures associated with the DNS entries become outdated and those DNS entries have to be signed again either manually or offline. A change to a DNS entry means a change to an IP address that the DNS entry is translated into. Therefore, for updates to DNS entries, traffic management device 110 signs or authenticates the new responses including updated IP addresses, and performs load balancing based on the new signed IP addresses, while discarding the outdated or older IP addresses (and hence, older DNS entries).

The examples of the technology described herein provide numerous advantages. For example, when client computers 104(1)-104(n) are in a DNSSEC environment requiring authenticated responses, examples disclosed herein enable such client computers 104(1)-104(n) to communicate with non-DNSSEC servers 102(1)-102(n) on a real time basis without any upgrades to software on client computers 104(1)-104(n). Such dynamic "on-the-fly" authentication performed by traffic management device 110 when servers 102(1)-102(n) are unable to sign the responses, ensure that the client computers 104(1)-104(n) receive valid resource records that are from a trusted source, and not from a rogue server or site. The technology described also enables administrators of large non-DNSSEC DNS deployments to quickly become DNSSEC compliant by interposing traffic management device 110 according to the examples disclosed in such legacy deployments resulting in an easy and fast DNSSEC compliance solution.

Having thus described the basic concepts, it will be rather apparent to those skilled in the art that the foregoing detailed disclosure is intended to be presented by way of example only and is not limiting. Various alterations, improvements, and modifications will occur and are intended to those skilled in the art, though not expressly stated herein. The order that the measures and processes for providing secure application delivery are implemented can also be altered. Furthermore, multiple networks in addition to network 112 and LAN 114 could be associated with traffic management device 110 from/to which network packets can be received/transmitted, respectively. These alterations, improvements, and modifications are intended to be suggested by this disclosure, and are within the spirit and scope of the examples. Additionally, the recited order of processing elements or sequences, or the use of numbers, letters, or other designations therefore, is not intended to limit the claimed processes and methods to any order except as can be specified in the claims.

The invention claimed is:

1. A method for providing authenticated domain name service comprising:
    forwarding at a traffic management device a request for a domain name from a client device to one or more servers coupled to the traffic management device;
    receiving at the traffic management device a denial of existence response for at least a first portion of the domain name from the one or more servers;
    creating at the traffic management device an authenticated response domain name at the traffic management device corresponding to the denial of existence response;
    attaching at the traffic management device a first signature to the created authenticated response domain name; and
    sending with the traffic management device the authenticated response domain name with the attached first signature to the client device.

2. The method as set forth in claim 1, wherein the request for the domain name is a domain name server security extension (DNSSEC) type request.

3. The method as set forth in claim 1, wherein the attaching the first signature comprises encrypting the response using a private key stored at the traffic management device, the method further comprising performing a hash of the encrypted response prior to the sending.

4. The method as set forth in claim 1, wherein the receiving further comprises receiving a response from the one or more servers comprising at least a second portion of the domain name wherein the at least a second portion of the domain name comprises a top-level domain name that is known by the traffic management device to be authenticated.

5. The method as set forth in claim 1, wherein the creating comprises:
    creating a secure resource record based upon the requested domain name independent of information in the denial of existence response.

6. The method as set forth in claim 1, wherein the received response includes a dynamically updated version of the requested domain name, the method further comprising:
    performing global server load balancing based upon the received dynamically updated version of the requested domain name.

7. The method as set forth in claim 1, wherein the request is received via a local domain name server on behalf of the client device.

8. A non-transitory computer readable medium having stored thereon instructions for providing authenticated domain name service comprising machine executable code which when executed by at least one processor, causes the processor to perform steps comprising:
    forwarding at a traffic management device a request for a domain name from a client device to one or more servers coupled to the traffic management device;

receiving at the traffic management device a denial of existence response for at least a first portion of the domain name from the one or more servers;

creating an authenticated response domain name at the traffic management device corresponding to the denial of existence response;

attaching at the traffic management device a first signature to the created authenticated response domain name; and sending the authenticated response domain name with the attached first signature to the client device.

9. The medium as set forth in claim 8, wherein the request for the domain name is a domain name server security extension (DNSSEC) type request.

10. The medium as set forth in claim 8, wherein the attaching the first signature comprises encrypting the response using a private key stored at the traffic management device, the method further comprising performing a hash of the encrypted response prior to the sending.

11. The medium as set forth in claim 8, wherein the receiving further comprises receiving a response from the one or more servers comprising at least a second portion of the domain name wherein the at least a second portion of the domain name comprises a top-level domain name that is known by the traffic management device to be authenticated.

12. The medium as set forth in claim 8, wherein the creating comprises:

creating a secure resource record based upon the requested domain name independent of information in the denial of existence response.

13. The medium as set forth in claim 8, wherein the received response includes a dynamically updated version of the requested domain name, wherein the machine executable code which when executed by the at least one processor, causes the processor to perform steps further comprising:

performing global server load balancing based upon the received dynamically updated version of the requested domain name.

14. The medium as set forth in claim 8, wherein the request is received via a local domain name server on behalf of the client device.

15. A traffic management device comprising:

one or more processor devices;

a memory coupled to the one or more processors by a bus; and a network interface controller coupled to the one or more processors and the memory and configured to be capable of receiving and forwarding data packets from a network that relate to a plurality of applications, at least one of the one or more processors configured to execute programmed instructions stored in the memory and the network interface controller with logic configured to implement:

forwarding at a traffic management device a request for a domain name from a client device to one or more servers coupled to the traffic management device;

receiving at the traffic management device a denial of existence response for at least a first portion of the domain name from the one or more servers;

creating an authenticated response domain name at the traffic management device corresponding to the denial of existence response;

attaching at the traffic management device a first signature to the created authenticated response domain name; and sending the authenticated response domain name with the attached first signature to the client device.

16. The device as set forth in claim 15, wherein the request for the domain name is a domain name server security extension (DNSSEC) type request.

17. The device as set forth in claim 15, wherein the attaching the first signature comprises encrypting the response using a private key stored at the traffic management device, the method further comprising performing a hash of the encrypted response prior to the sending.

18. The device as set forth in claim 15, wherein the receiving further comprises receiving a response from the one or more servers comprising at least a second portion of the domain name wherein the at least a second portion of the domain name comprises a top-level domain name that is known by the traffic management device to be authenticated.

19. The device as set forth in claim 15, wherein the creating comprises:

creating a secure resource record based upon the requested domain name independent of information in the denial of existence response.

20. The device as set forth in claim 15, wherein the received response includes a dynamically updated version of the requested domain name, wherein the at least one of the one or more processors configured to further implement:

performing global server load balancing based upon the received dynamically updated version of the requested domain name.

21. The device as set forth in claim 15, wherein the request is received via a local domain name server on behalf of the client device.

* * * * *